Aug. 14, 1923.

Re. 15,676

E. O. WEEKS

RADIATOR

Original Filed Feb. 24, 1919

INVENTOR.
Elling O. Weeks.
BY Moesell & Keeney.
ATTORNEYS.

Reissued Aug. 14, 1923. Re. 15,676

UNITED STATES PATENT OFFICE.

ELLING O. WEEKS, OF CHICAGO, ILLINOIS, ASSIGNOR OF ONE-HALF TO JOHN A. STRANSKY, OF CHICAGO, ILLINOIS.

RADIATOR.

Original No. 1,337,576, dated April 20, 1920, Serial No. 278,612, filed February 24, 1919. Application for reissue filed May 15, 1920. Serial No. 381,749.

*To all whom it may concern:*

Be it known that I, ELLING O. WEEKS, a citizen of the United States, residing at Chicago, in the county of Cook and State of Illinois, have invented new and useful Improvements in Radiators, of which the following is a specification.

This invention relates to radiators for automobiles and the like, and the principal object of the invention is to provide means for receiving the overflow caused by the expansion of the water in the radiator and returning it to the radiator when the same needs refilling.

Another object of the invention is to provide means for automatically returning the collected water to the radiator when the water therein falls below a certain point.

Still another object of the invention is to provide means for producing a partial vacuum in the radiator by connecting the same to the suction part of the motor, such means being associated with means for breaking the connection when the radiator is full.

Still another object of the invention is to provide means for supplying moist vapor to the intake manifold of the motor to improve the combustible quality of the motor fuel and to eliminate the formation of carbon in the cylinders of the motor.

Still another object of the invention is to provide a float means positioned within or adjacent the radiator for automatically controlling the level of the cooling medium within the radiator, and also for controlling the amount of moist vapor supplied to the intake manifold.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

Figure 1:
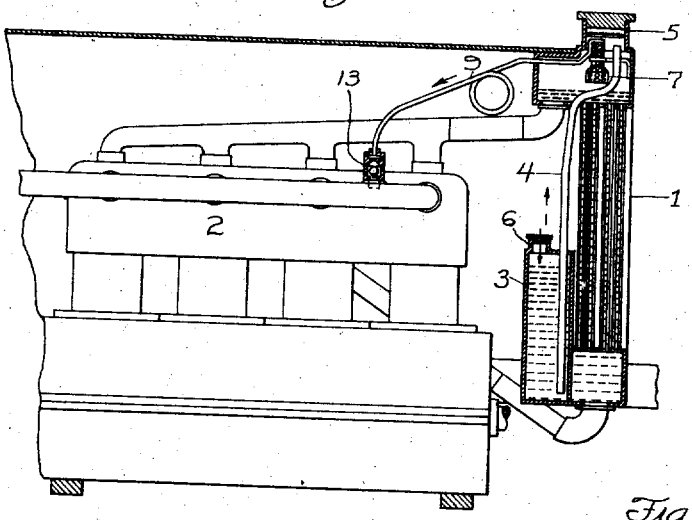
Figure 1 is a sectional view of the front part of an automobile supplied with my invention.
Figure 2:
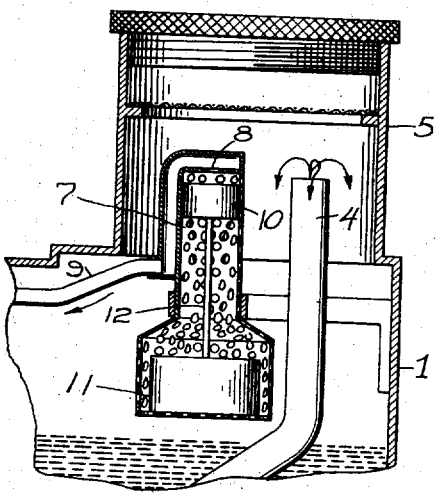
Fig. 2 is an enlarged detail view.

In these views, 1 indicates the radiator, which is constructed as usual and which is connected with the motor 2 in the ordinary manner. In carrying out my invention, I provide a cooling tank 3, which may be located at any suitable point, though I prefer to connect it with the lower part of the radiator, as shown in the drawings. This tank 3 receives the lower end of the usual overflow pipe 4, the upper end of which extends into the filling spout 5 of the radiator. The tank 3 may be provided with a filling spout 6. Both of these spouts must be provided with caps and that for spout 5 must make an air-tight fit, so as to prevent any entrance of air to the radiator. The cap for spout 6 is provided with an air hole. In the upper part of the radiator is located a float chamber 7, the walls of which are perforated to permit the free entrance of water thereto. The upper end of this chamber is provided with a port 8, which communicates with a pipe 9, which is connected with the inlet manifold of the motor. This port is controlled by a valve 10, located in the float chamber and said valve is connected with the float 11 by the rod 12. It will thus be seen that when the water in the radiator is high enough to raise the float, the valve will cover the port and thus prevent the air from being exhausted from the top of the radiator by the suction action of the engine. A check valve 13 is located in the pipe 9, so as to prevent any vacuum existing in the radiator from being broken by the flow of air from the engine to the radiator when the engine is not running.

While the air is being exhausted from the radiator by the suction or partial vacuum formed in the intake manifold the hot moist air or vapor in the upper portion of the radiator will be drawn into the intake manifold and mixed with the incoming fuel of the engine, and will heat and dampen the same and render it more combustible and less liable to the formation of carbon.

When the system is filled with water and the engine started, the water will expand on being heated, so that it will rise above the overflow pipe and the water passing through this pipe will pass into the tank 3. When the water level drops in the radiator for any reason low enough to permit the valve to uncover the port 8, a vacuum will be created in the upper part of the radiator by the suction of the engine, so that the water in the tank 3 will be drawn through the pipe 4 back into the radiator and at the same time moist air or vapor in the upper portion of the radiator is drawn into the intake manifold and mixed with the gases and will heat and moisten the same, and this will continue until the water reaches the float 11 and raises the same to cause the valve 10 to cover the port 8, and thus prevent further exhausting of the air from the radiator.

As there is always more or less vibration while the engine is running the valve will also be vibrated and slightly opened and permit a small constant supply of moist vapor to the intake manifold.

In this way, the radiator is automatically kept filled, and when an anti-freezing solution is used in the radiator there is no danger of the same being discharged through the overflow pipe and lost.

Figure 3:
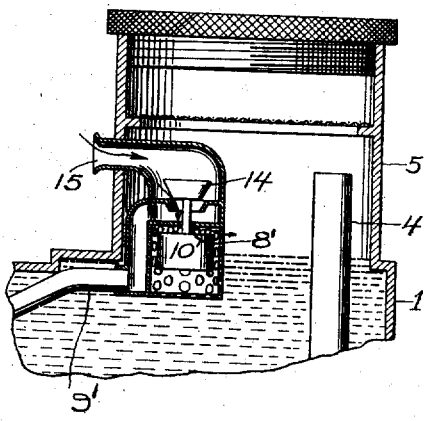
Fig. 3 is a modification showing the valve in open position.

In the modification shown in Fig. 3 the float chamber is provided with a port 8′, which opens into the pipe 9′, which is connected with the intake manifold as before described, but the valve 10′ is adapted to control a port 14 communicating with the upper part of the pipe 9′ and opening out into a large pipe 15, which leads to the atmosphere. In this way when the float is raised by the water in the radiator the air will pass from the pipe 15 into the pipe 9′ and thus break the suction in the float chamber and radiator, as the port 14 is much larger than the port 8′.

What I claim is:

1. A device of the class described, comprising an air-tight radiator, a tank, a pipe connecting the radiator with the tank, means for creating a vacuum in said radiator, and means for automatically breaking said vacuum when the water reaches a certain point in the radiator.

2. A device of the class described, comprising an air-tight radiator, a tank, a pipe connecting the radiator with the tank, a float chamber in said radiator, means for connecting the same with the inlet manifold of the motor, a valve controlling said connection, and a float in said chamber connected with said valve.

3. An engine, comprising a radiator member, a tank, an overflow means in communication with the upper portion of the radiator member and the lower portion of the tank, and means caused by and while the engine is in operation for automatically moving a cooling medium contained within the tank through the overflow means and into the radiator member when the level of a similar medium within the radiator reaches a predetermined level.

4. An engine, comprising a radiator member for containing a cooling medium, a tank for containing a similar medium, an overflow means in communication with the upper portion of the radiator member and the lower portion of the tank, and means caused by and while the engine is in operation for creating a condition within the radiator member which will cause atmospheric pressure to force the cooling medium contained within the tank through the overflow means and into the radiator member when the cooling medium within the radiator member is lowered to a predetermined level.

5. An engine, comprising a radiator member for containing a cooling medium, a tank for containing a similar medium, an overflow pipe extending into the upper portion of the radiator and into the lower portion of the tank to permit the cooling medium to overflow from the radiator through the pipe and into the tank, and the return of the cooling medium to the radiator, and another pipe extending from the radiator member to the engine to create a condition within the radiator member while the engine is in operation which will cause atmospheric pressure to return a portion of the cooling medium within the tank back through the overflow pipe and into the radiator member when the cooling medium within the radiator is lowered to a predetermined level.

6. A radiator, comprising a radiator member for containing a cooling medium, a tank for containing a similar medium, an overflow pipe extending into the upper portion of the radiator and into the lower portion of the tank to permit the cooling medium to overflow from the radiator through the pipe and into the tank, a suction pipe extending from the radiator member to a source of power to create a partial vaccum within the radiator which will cause atmospheric pressure to return a portion of the cooling medium within the tank back through the overflow pipe and into the radiator member, and a float valve connected to the suction pipe for controlling the creation of the partial vacuum within the radiator by the level of the cooling medium in said radiator member.

7. A radiator and intake manifold attachment, comprising a tank for connection with the overflow pipe of the radiator for receiving and returning the cooling medium from and to the radiator, a suction pipe connecting the intake manifold to the upper portion of the radiator for recharging the radiator from the tank, and a float valve controlling the end portion of the suction pipe which is connected to the radiator.

In testimony that I claim the foregoing as my own, I have hereto affixed my signature in the presence of two witnesses.

ELLING O. WEEKS.

Witnesses:

C. H. KEENEY,

LYNN F. PEASE.